United States Patent
Colavolpe et al.

(10) Patent No.: US 9,722,691 B2
(45) Date of Patent: Aug. 1, 2017

(54) DATA DETECTION METHOD AND DATA DETECTOR FOR SIGNALS TRANSMITTED OVER A COMMUNICATION CHANNEL WITH INTER-SYMBOL INTERFERENCE

(71) Applicant: Agence Spatiale Europeenne, Paris (FR)

(72) Inventors: Giulio Colavolpe, Parma (IT); Andrea Modenini, Parma (IT); Amina Piemontese, Monte Sant'Angelo-Foggia (IT); Nader Alagha, Wassenaar (NL)

(73) Assignee: Agence Spatiale Europeenne, Paris (FR)

( * ) Notice: Subject to any disclaimer, the term of this patent is extended or adjusted under 35 U.S.C. 154(b) by 75 days.

(21) Appl. No.: 14/650,655

(22) PCT Filed: Dec. 10, 2012

(86) PCT No.: PCT/IB2012/003001
§ 371 (c)(1),
(2) Date: Jun. 9, 2015

(87) PCT Pub. No.: WO2014/091271
PCT Pub. Date: Jun. 19, 2014

(65) Prior Publication Data
US 2015/0311973 A1  Oct. 29, 2015

(51) Int. Cl.
*H04B 1/10*   (2006.01)
*H04B 1/7105*  (2011.01)
(Continued)

(52) U.S. Cl.
CPC ............. *H04B 7/1851* (2013.01); *H04B 1/10* (2013.01); *H04B 1/7105* (2013.01);
(Continued)

(58) Field of Classification Search
CPC ........... H03M 13/3905; H03M 13/256; H03M 13/3922; H03M 13/3955; H04B 1/10;
(Continued)

(56) References Cited

U.S. PATENT DOCUMENTS 6,952,444 B1* 10/2005 Segal ................ H04L 25/03063
375/232
7,012,772 B1* 3/2006 Vis ................... G11B 20/10009
360/46

OTHER PUBLICATIONS

Giulio Clavolpe, Senior Member, IEEE, and Amina Piemontese, Member, IEEE, Novel SISO Detection Algorithms for Nonlinear Satellite Channels, Feb. 2012, IEEE Wireless Communication Letter, vol. 1, No. 1.*

(Continued)

*Primary Examiner* — Ayaz Sheikh
*Assistant Examiner* — Debebe Asefa
(74) *Attorney, Agent, or Firm* — Alston & Bird LLP

(57) ABSTRACT

A data detection method, having the steps of: a. receiving a signal transmitted over a communication channel, the signal being representative of at least a stream of interfering symbols $x_k$, each representing one or more bits of a transmitted message; b. filtering the received signal through at least a filter bank having at least a first filter representative of a linear response of the channel and a second filter representative of a non-linear response of the channel, and sampling the filtered signals at the symbol rate, thus obtaining respective sequences of filtered samples $r_k^{(1)}$ $r_k^{(3)}$; and c. jointly computing the a posteriori probabilities of N>1 consecutive symbols $x_k$. A data detector for carrying out such a method, and a method of transmitting data over a nonlinear channel, optimizing spectral efficiency when data detection is performed using such a method is also provided.

23 Claims, 6 Drawing Sheets

(51) Int. Cl.
  *H04W 84/06* (2009.01)
  *H04L 25/03* (2006.01)
  *H04B 7/185* (2006.01)
(52) U.S. Cl.
  CPC .. H04L 25/03171 (2013.01); H04L 25/03891 (2013.01); *H04W 84/06* (2013.01)
(58) Field of Classification Search
  CPC ................ H04B 1/7105; H04B 7/1851; H04B 25/03171; H04B 25/03891; H04W 84/06
  See application file for complete search history.

(56) References Cited

OTHER PUBLICATIONS

Faisal M. Kashif, Henk Wymeersch, Member, IEEE, MOe Z. Win, Fellow, IEEE, Monte Carlo Equalization for Nonlinear Dis[ersive satellite Channels, Feb. 2008, IEEE Journal on Selected Areas in Communications, vol. 26, No. 2.*
International Search Report and Written Opinion for corresponding International Application No. PCT/IB2012/003001, dated Aug. 14, 2013.
Colavolpe, Giulio, *Novel SISO Detection Algorithms for Nonlinear Satellite Channels*, IEEE Wireless Communications Letters, vol. 1, No. 1 (Feb. 2012) 22-25.
Kashif, F. M. et al., *Monte Carol Equalization for Nonlinear Satellite Channels*, IEEE Journal of Selected Areas in Communications, vol. 26, No. 2 (Feb. 2008) 245-255.
ETSI EN 301 307 Digital Video Broadcasting (DVB); V1.1.2 (Jun. 2006), Second generation framing structure, channel coding and modulation systems for Broadcasting, Interactive Services, News Gathering and other Broadband satellite applications, 2006.
Mazo, J. E., *Faster-than-Nyquist signaling*, Bell System Tech. J., vol. 54 (Oct. 1975) 1450-1462.
Mazo, J. E. et al., *On the minimum distance problem for faster-than-Nyquist signaling*, IEEE Trans. Inform. Theory (Nov. 1988) 1420-1427.
Liveris, A. et al., *Exploiting faster-than-Nyquist signaling*, IEEE Trans. Commun. (Sep. 2003) 1502-1511.
Rusek, F. et al., *On information rates of faster than Nyquist signaling*, in Proc. IEEE Global Telecommun. Conf., (San Francisco, CA, U.S.A.) (Nov. 2006).
Rusek, F. et al., *Maximal capacity partial response signaling*, in Proc. IEEE Intern. Conf. Commun. (Jun. 2007) 821-826.
Barbieri, A. et al., *Time-frequency packing for linear modulations: spectral efficiency and practical detection schemes*, IEEE Trans. Commun., vol. 57 (Oct. 2009) 2951-2959.
Modenini, A et al., *How to significantly improve the spectral efficiency of linear modulations through time-frequency packing and advanced processing*, in Proc. IEEE Intern. Conf. Commun. (Jun. 2012) 3299-3303.
Calderbank, A. R. et al., *Nonequiprobable signaling on the Gaussian channel*, IEEE Trans. Inform. Theory, vol. 36 (Jul. 1990) 726-740.
Rusek, F. et al., *The two dimensional Mazo limit*, in Proc. IEEE International Symposium on Information Theory, (Adelaide, Australia), (Nov. 2005) 970-974.
Beidas, B. F. et al., *Analysis and compensation for nonlinear interference of two high-order modulation carriers over satellite link*, IEEE Trans. Commun., vol. 58 (Jun. 2010) 1824-1833.
Beidas, B. F., *Intermodulation distortion in multicarrier satellite systems: analysis and turbo Volterra equalization*, IEEE Trans. Commun., vol. 59 (Jun. 2011) 1580-1590.

Colavolpe, G. et al., *Novel SISO Detection Algorithms for Nonlinear Satellite Channels*, IEEE Wireless Commun. Letters, vol. 1 (Feb. 2012) 22-25.
Benedetto, S. et al., *Nonlinear equalization of digital satellite channels*, IEEE J. Select. Areas Commun., vol. 1 (Jan. 1983) 57-62.
C. Douillard, C. et al., *Iterative correction of intersymbol interference: turbo-equalization*, European Trans. Telecommun.,vol. 6 (Sep./Oct. 1995) 507-511.
Tuchler, M. et al., *Turbo equalization: Principles and new results*, IEEE Trans. Commun., vol. 55 (May 2002) 754-767.
Tuchler, M. et al., *Minimum mean square error equalization using a priori information*, IEEE Trans. Signal Processing, vol. 50 (Mar. 2002) 673-683.
Colavolpe, G. et al., *Algorithms for iterative decoding in the presence of strong phase noise*, IEEE J. Select. Areas Commun., vol. 23 (Sep. 2005) 1748-1757.
Forney, G. D. Jr., *Maximum-likelihood sequence estimation of digital sequences in the presence of intersymbol interference*, IEEE Trans. Inform. Theory, vol. 18 (May 1972) 284-287.
Ungerboeck, G., *Adaptive maximum likelihood receiver for carrier-modulated data-transmission systems*, IEEE Trans. Commun., vol. com-22 (May 1974) 624-636.
Bahl, L. R. et al., *Optimal decoding of linear codes for minimizing symbol error rate*, IEEE Trans. Inform. Theory, vol. 20 (Mar. 1974) 284-287.
Colavolpe, G. et al., *On MAP symbol detection for ISI channels using the Ungerboeck observation model*, IEEE Commun. Letters, vol. 9 (Aug. 2005) 720-722.
Colavolpe, G. et al., *Reduced-state BCJR-type algorithms*, IEEE J. Select. Areas Commun., vol. 19 (May 2001) 848-859.
Fertonani, D. et al., *Reduced-complexity BCJR algorithm for turbo equalization*, IEEE Trans. Commun., vol. 55 (Dec. 2007) 2279-2287.
Rusek, F. et al., *A comparison of Ungerboeck and Forney models for reduced-complexity ISI equalization*, in Proc. IEEE Global Telecommun. Conf., (Washington, DC, U.S.A.) (Nov. 2007).
Wang, X. et al., *Iterative (turbo) soft interference cancellation and decoding for coded CDMA*, IEEE Trans. Commun., vol. 47 (Jul. 1999) 1046-1061.
Gamal, H. E. et al., *Iterative multiuser detection for coded CDMA signals in AWGN and fading channels*, IEEE J. Select. Areas Commun., vol. 18 (Jan. 2000) 30-41.
Fertonani, D. et al., *Novel graph-based algorithms for soft-output detection over dispersive channels*, in Proc. IEEE Global Telecommun. Conf, (New Orleans, LA, USA), (Nov.-Dec. 2008).
Colavolpe, G. et al., *SISO detection over linear channels with linear complexity in the number of interferers*, IEEE J. of Sel. Topics in Signal Proc., vol. 5 (Dec. 2011) 1475-1485.
Proakis, J. G. et al., *Digital Communications*. New York: McGraw-Hill, 4th ed., (2001).
Kschischang, F. R. et al., *Factor graphs and the sum-product algorithm*, IEEE Trans. Inform. Theory, vol. 47 (Feb. 2001) 498-519.
Richardson, T. et al., *The capacity of low density parity check codes under message passing decoding*, IEEE Trans. Inform. Theory, vol. 47 (Feb. 2001) 599-618.
Colavolpe, G. et al., *On the application of factor graphs and the sum-product algorithm to ISI channels*, IEEE Trans. Commun., vol. 53 (May 2005) 818-825.
Rusek, F. et al., *Optimal channel shortening for MIMO and ISI channels*, IEEE Trans. Wireless Commun., vol. 11 (Feb. 2012) 810-818.
Arnold, D. M. et al., *Simulation-based computation of information rates for channels with memory*, IEEE Trans. Inf. Theory, vol. 52 (Aug. 2006) 3498-3508.

* cited by examiner p

DATA DETECTION METHOD AND DATA DETECTOR FOR SIGNALS TRANSMITTED OVER A COMMUNICATION CHANNEL WITH INTER-SYMBOL INTERFERENCE

FIELD

The invention relates to a method of detecting data transmitted over a communication channel with inter-symbol interference, and to a data detector for carrying out such a method. The invention also relates to a method of transmitting data over a communication channel which is optimal when, at the receiving end of the channel, data detection is performed using said method.

The invention applies in particular, albeit not exclusively, to non-linear channels, and more particularly to satellite communication systems.

BACKGROUND

In satellite systems, orthogonal signalling, that ensures absence of intersymbol interference (ISI), is often adopted. For example, in the 2nd-generation satellite digital video broadcasting (DVB-S2) standard [1], a conventional square-root raised-cosine (RRC) pulse shaping filter is specified at the transmitter. In an additive white Gaussian noise channel and in the absence of other impairments, the use of a RRC filter at the receiver and proper sampling ensure that optimal detection (i.e. detection with minimal symbol error rate) can be performed on a symbol-by-symbol basis. On the other hand, it is known that, when finite-order constellations are considered (e.g., phase-shift keying (PSK)), the efficiency of the communication system can be improved by relaxing the orthogonality condition, thus introducing ISI. For example, faster-than-Nyquist signalling (FTN, see [2, 3, 4]) is a well known technique consisting of reducing the spacing between two adjacent transmit pulses in the time-domain well below the Nyquist rate ("Time packing").

Moreover, the frequency spacing between carriers in multi-carrier transmission can be reduced ("Frequency packing") to increase spectral efficiency while introducing some inter-carrier interference (ICI).

Even when orthogonality is not given up on purpose, some amount of ISI is introduced by the nonlinear response of the satellite transponder or the ground segment power amplifier ("nonlinear ISI", as opposed to the "linear ISI" due to Time packing).

Several works in the published literature deal with optimal—or at least nearly-optimal—detection of signal transmitted over linear and/or nonlinear channels with ISI and, when applicable, with ICI. However, the complexity of the receivers of the prior art easily becomes unmanageable.

This is indeed the case for the optimal detector for the "original" FTN signalling, described in [5, 6]. Moreover, these papers do not provide any hint on how to perform the optimization in the more practical scenario where a reduced-complexity receiver is employed.

Paper [7] teaches maximizing the achievable spectral efficiency (ASE) for an additive white Gaussian noise (AWGN) channel, with single or multiple carrier transmission. Detection is performed using a suboptimal symbol-by-symbol detector. Reference [8] describes a more sophisticated detection algorithm with constrained complexity which, however, is still sub-optimal and limited to the case of a linear channel.

The most effective detection algorithms over linear ISI channels, from complexity and performance points of view, are those employing turbo detection [15, 16, 17], which are based on the exchange of information between two (or more) soft-input soft-output (SISO) devices that iteratively refine the quality of their outputs. In DVB-S2, turbo detection can be already considered between the inner detector coping with the channel phase noise and the outer LDPC decoder [18]. Two approaches for maximum-a posteriori (MAP) sequence detection in the presence of linear ISI are known since the early Seventies, due to Forney [19] and Ungerboeck [20]. Both approaches can be extended to MAP symbol detection by resorting to the general forward-backward algorithm (FBA) derived in [21]—see [22] for Ungerboeck's approach. The main drawback of these algorithms is that their trellis size grows exponentially with the number of interfering symbols, so that the implementation of suboptimal algorithms that provide a convenient performance/complexity trade-off is mandatory. Most low-complexity algorithms in the literature maintain the three-stage structure of the FBA, and obtain complexity reduction by performing a simplified trellis search (for instance, see [23, 24]). In particular, the algorithm in [24] works on the trellis describing the channel memory but explores only the most promising paths, chosen according to the MAP criterion. Similarly to all other algorithms in the literature, this algorithm provides a satisfactory performance compared to the optimal detector for a linear channel when the Forney observation model is adopted, but, for reasons discussed in [25, 24], does not perform effectively when the Ungerboeck model is adopted.

The soft interference cancellation (SIC) algorithm proposed in [26, 27] for code-division multiple-access systems can still be applied to the linear ISI scenario. However, its complexity is quadratic in the channel memory when the sliding window approach described in [17, 16] is adopted and cannot extended to the case of a non-linear channel.

A different approach, using the framework based on factor graphs (FGs) and the sum-product algorithm (SPA), was investigated recently [28, 29] for linear channels. It promises to provide a very convenient performance/complexity trade-off, with a complexity which increases linearly with the channel memory [28, 29]. The extension of this algorithm to a nonlinear satellite channel has been recently derived in [13] but its performance is not satisfactory in conditions of strong interference, as resulting e.g. from the adoption of the time-packing technique.

SUMMARY

The invention aims at providing a method of detecting data transmitted over a nonlinear channel with ISI and possibly ICI, showing symbol error rate performances near to those of an optimal (ideal) detector, but having much lower complexity. The invention also aims at providing a data detector implementing such a method and therefore showing limited complexity and high performances. The invention also aims at providing a spectrally efficient method of transmitting data over a nonlinear channel, exploiting the performances of the inventive detection method.

An object of the present invention is then a data detection method according to claim 1, comprising the steps of:
a. receiving a signal transmitted over a communication channel, said signal being representative of at least a stream of interfering symbols $x_k$, each representing one or more bits of a transmitted message;
b. filtering the received signal through at least a filter bank comprising at least a first filter representative of a linear response of said channel and a second filter representative of a non-linear response of said channel, and sampling the filtered signals at the symbol rate, thus obtaining respective sequences of filtered samples $r_k^{(1)}$, $r_k^{(3)}$; and c. jointly computing the a posteriori probabilities of N>1 consecutive symbols $x_k$ by applying the sum-product algorithm to a joint probability mass function expressed by the product of N terms, each being associated to a symbol $x_k$ and being proportional to the product of an indicator function, an a priori probability, a first function representing the inter-symbol interference due to the Q symbols which precede said symbol $x_k$ and of a second function representing the inter-symbol interference due to the (L–Q) symbols immediately preceding said Q symbols which precede symbol k;

where:

L is an integer greater than zero, representing the memory of the nonlinear channel;

Q is an integer greater than zero and not greater than L, serving as a design parameter;

thus realizing simultaneous soft-input-soft-output detection of a packet of N symbols of the transmitted message.

A simplified embodiment with Q=0 may also be considered, particularly when combined with "channel shortening", for some applications e.g. without time packing.

Another object of the invention is a data detector according to claim 15, comprising:

at least a filter bank comprising at least a first filter representative of a linear response of a communication channel and a second filter representative of a non-linear response of said channel;

a sampler for sampling the outputs of said filters at a symbol rate of a received signal, thus obtaining respective sequences of filtered samples $r_k^{(1)}, r_k^{(3)}$; and a processor for taking said sequences of filtered samples as inputs and realizing simultaneous soft-input-soft-output detection of a packet of N interfering symbols $x_k$ by applying the sum-product algorithm to a probability mass function expressed by the product of N terms, each being associated to a symbol $x_k$ and being proportional to the product of an indicator function, an a priori probability, a first function representing the inter-symbol interference due to the Q symbols which precede said symbol $x_k$ and of a second function representing the inter-symbol interference due to the (L–Q) symbols immediately preceding said Q symbols which precede symbol k.

Yet another object of the invention is a method of transmitting data over a communication channel according to claim 22, comprising modulating at least one carrier using a succession of pulses having a same shape and a complex amplitude chosen among a discrete set of allowed values defining a finite-order constellation, the method being characterized in that at least one parameter chosen between a bandwidth of said pulses, their shape, and a temporal spacing between said pulses is chosen so as to maximize spectral efficiency when detection is performed using a method according to the invention.

Particular embodiments of the invention constitute the subject-matter of the dependent claims.

Additional features and advantages of the present invention will become apparent from the subsequent description, taken in conjunction with the accompanying drawings, wherein:

DETAILED DESCRIPTION

Figure 1:
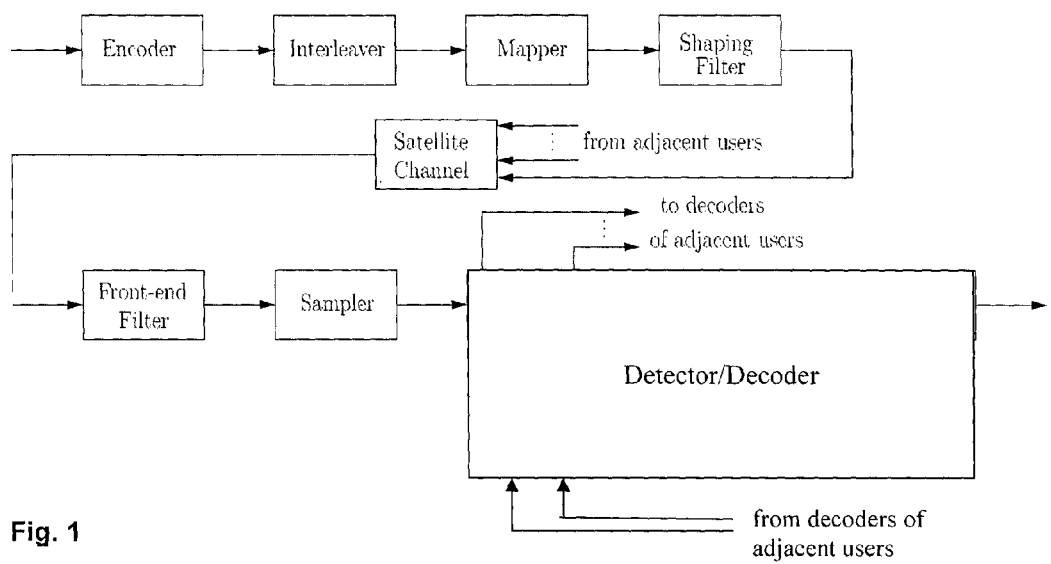
FIG. 1 shows a low-pass equivalent model of an exemplary communication system comprising a data detector according to the invention.

The present invention will be described with reference to a frequency-division-multiplexed satellite communication system, whose block diagram is illustrated on FIG. 1. The stream of bits constituting a message to be transmitted is encoded by an encoder (e.g. a turbo encoder), interleaved (this step being optional), then each block of M bits (M≥0.1) is mapped to a complex symbol belonging to a complex constellation X. A shaping filter converts each symbol to a suitable complex pulse p(t), e.g. a Raised Root Cosine (RRC) pulse. Pulses are then used to modulate a radio-frequency carrier (not shown on the figure, which represents a low-pass equivalent model of the actual system) and amplified.

Several pulse sequences, generated by several independent users and modulating respective carriers, are then transmitted over a satellite channel. At the receiving end, after a demodulation step, which is not represented, the received signal corresponding to a user is filtered by a front-end filter and sampled. The samples are provided as inputs to a detector/decoder whose structure and operation will be described below. Moreover, each detector/decoder exchanges information with the detectors/decoders for "adjacent users", i.e. for adjacent carriers.

Without loss of generality, it is possible, as an example and for illustrative purposes only, to consider perfectly synchronized (forward link assumption) adjacent users employing a same linear modulation format, shaping pulse p(t), and symbol interval (or time spacing) T. The transmitted signal can be expressed as $$x(t) = \sum_n \sum_\ell x_{n,\ell} p(t-nT) e^{j2\pi \ell F_u t} \quad (1)$$

where $x_{n,l}$ is the symbol transmitted over the lth channel during the nth symbol interval, and $F_u$ the frequency spacing between adjacent channels (in the computation of the spectral efficiency, $F_u$ can be used as a measure of the signal bandwidth for the uplink). The transmitted symbols $\{x_{n,l}\}$ are independent and uniformly distributed and belong to a given zero-mean M-ary complex constellation X.

In the DVB-S2 standard, the base pulse p(t) has RRC-shaped spectrum (RRC pulse in the following) with roll-off factor α. The technique described here applies to general pulses, not necessarily band-limited or satisfying the Nyquist criterion for the absence of ISI for some given value of the symbol interval.

Figure 2:
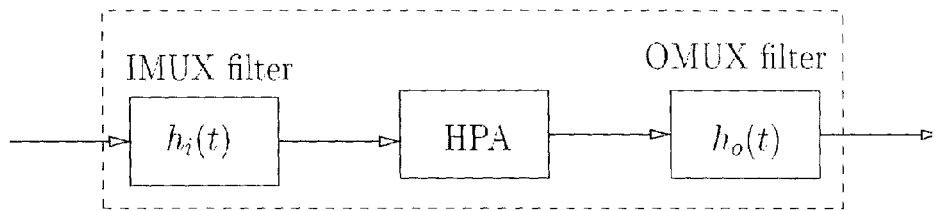
FIG. 2 is a block diagram of a satellite transponder used in the satellite channel of said communication system, and introducing nonlinearity.

The satellite channel comprises a satellite transponder for each carrier occupying the entire transponder bandwidth (single-channel-per-transponder). The on-board high power amplifier (HPA) can operate close to saturation and hence with high efficiency, but has a nonlinear response. An Input Multiplexer (IMUX) filter selects only one carrier, and different carriers are amplified by different transponders. An Output Multiplexer (OMUX) filter reduces then the out-of-band power due to the spectral regrowth after nonlinear amplification (see FIG. 2). The outputs of different transponders are then multiplexed again and it is assumed that the adjacent users have a frequency separation of $F_d$, possibly different from that in the uplink.

In this single-channel-per-transponder scenario, the useful signal at the user terminal is the sum of independent contributions, one for each user, although these contributions are no more, rigorously, linearly modulated due to the nonlinear transformation of the on-board HPA.

If time packing is used, the symbol interval T is shorter than the value ensuring orthogonal signalling, and therefore ISI is present. In any case, some ISI is necessarily introduced by the nonlinear response of the transponder and the presence of IMUX and OMUX filters. Moreover, frequency separation $F_u, F_d$ can be lower than the channel bandwidth, thus introducing some inter-carrier interference (ICI).

An alternative scenario would be the so-called "multiple-channel-per-transponder", where a single transponder amplifies several carriers, and nonlinearity introduces additional ICI.

The inventive data detection method only applies to the "single-channel-per-transponder" scenario, considering two cases: single-user receiver and multiple-user receiver. In the "multiple-channel-per-transponder" scenario detection can be performed using alternative methods known from the prior art, e.g. [11] for single-user receivers and [12] for multiple-users receivers.

The single-user receiver, single-channel-per-transponder embodiment of the invention will be considered first, due to its lower complexity as only ISI (both linear and nonlinear) has to be considered. Assuming that all adjacent channels will be removed by the IMUX filter (or their interference neglected), the signal at the transponder input is:

$$x(t) = \sum_k x_k p(t - kT),$$

where $x_k$ is the symbol transmitted during the kith symbol interval by user l=0 (that is $x_{k,l}=x_{k,0}$). The starting point to derive a low-complexity SISO detection algorithm is the approximate signal model described in [13], which is based on an approximate Volterra-series expansion of the satellite channel. This model will be briefly revised. The impulse response of the system up to the HPA is defined as $h(t)=p(t) \otimes h_i(t)$, where symbol $\otimes$ denotes "convolution" and $h_i(t)$ is the input response of the IMUX. The signal at the HPA output can be expressed as a function of x(t) by using a polynomial expansion in which only odd-order terms appear [14]. The signal is then filtered through the OMUX filter with input response $h_o(t)$. As well-known in the literature, the signal s(t) at the transponder output can be expressed using a third order nonlinearity model as $$s(t) \simeq \gamma_1 \sum_k x_k h^{(1)}(t - kT) + \frac{3}{4}\gamma_3 \sum_i \sum_j \sum_\ell x_i x_j x_\ell^* h^{(3)}(t - iT, t - jT, t - \ell T)$$

where $$h^{(1)}(t) = h(t) \otimes h_o(t),$$

and $$h^{(3)}(t_1, t_2, t_3) = \int_{-\infty}^{\infty} h_o(\tau)h(t_1 - \tau)h(t_2 - \tau)h^*(t_3 - \tau)d\tau.$$

The functions $\gamma_1 h^{(1)}(t)$ and $$\frac{3}{4}\gamma_3 h^{(3)}(t_1, t_2, t_3)$$

are to me so-called Volterra kernels of first and third order, respectively. In [13], an approximate Volterra representation is used to simplify the signal expression at the transponder output. The approximation consists of holding only the terms in the form $x_p |x_q|^2$ among the 3-symbols products $x_i.x_j.x_l^*$ which appear in the polynomial expansion (2), and using the approximation $|x_p|^2 = E\{|x_p|^2\}$ when $p \neq q$. The signal thus becomes $$s(t) = \sum_k x_k [g^{(1)}(t - kT) + |x_k|^2 g^{(3)}(t - kT)] \quad (3)$$

where $$g^{(1)}(t) = \gamma_1 h^{(1)}(t) + \frac{3}{4}\gamma_3 \sum_{i \neq 0} \overline{h}^{(3)}(t - iT, t)$$

$$g^{(3)}(t) = \frac{3}{4}\gamma_3 \overline{h}^{(3)}(t, t).$$

$$\overline{h}^{(3)}(t_1, t_2) = h^{(3)}(t_2, t_1, t_1) + h^{(3)}(t_1, t_2, t_1) - I(t_1 - t_2)h^{(3)}(t_2, t_2, t_2).$$

and I(t) is an indicator equal to one when t=0, zero otherwise.

Without loss of generality, perfect frequency, phase, and timing synchronization will be considered as an example and for illustrative purposes only. Assuming ideal synchronization, the low-pass equivalent of the received signal can be written as [30]

$$r(t)=s(t)+w(t) \quad (4)$$

where s(t) is given in (3) and w(t) is a zero-mean circularly-symmetric Gaussian process with power spectral density $2N_0$. The receiver is assumed to perfectly know the pulses $g^{(1)}(t)$ and $g^{(3)}(t)$ and the value of $N_0$. It is assumed that the user transmits a packet of N symbols, which are collected into vector $x=\{x_0, \ldots, x_{N-1}\}$.

Let r be a proper set of sufficient statistics, extracted from the received signal, collected in a vector of proper length. The joint maximum-a-posteriori (MAP) detection of symbols $\{x_n\}$ requires the evaluation of the a-posteriori probabilities (APPs) $P(x_n|r)$. The probability mass function of the transmitted sequence can be factorized as $$P(x) = \prod_{n=0}^{N-1} P_n(x_n) \quad (5)$$

where $P_n(x_n)$ is the a priori probability that the symbol $x_n$ is transmitted with index n. The conditional probability density function of r given the modulation symbols x is $$p(r \mid x) \propto \exp\left(-\frac{1}{2N_0} \int_{-\infty}^{\infty} |r(t) - s(t)|^2 \, dt\right). \quad (6)$$

Substituting (3) in (6) and defining the following coefficients:

$$h_i^{(1)} = \int_{-\infty}^{\infty} g^{(1)}(t) g^{(1)*}(t - iT) dt$$

$$h_i^{(3)} = \int_{-\infty}^{\infty} g^{(3)}(t) g^{(3)*}(t - iT) dt$$

$$h_i^{(1,3)} = \int_{-\infty}^{\infty} g^{(3)}(t) g^{(1)*}(t - iT) dt$$

$$r_i^{(1)} = \int_{-\infty}^{\infty} r(t) g^{(1)*}(t - iT) dt \quad (7)$$

$$r_i^{(3)} = \int_{-\infty}^{\infty} r(t) g^{(3)*}(t - iT) dt \quad (8)$$

after straightforward manipulations and assuming that the memory of the channel is of L symbols (that is, $h_i^{(1)}=0$, $h_i^{(3)}=0$, and $h_i^{(1,3)}=0$, for $|i|>L$) (6) can be expressed as $$p(r \mid x) \propto \prod_{k=0}^{N-1} \exp\left\{\frac{1}{N_0} \mathrm{Re}[x_k^*(r_k^{(1)} + |x_k|^2 r_k^{(3)})]\right\} \cdot \quad (9)$$

$$\exp\left[-\frac{1}{N_0} \mathrm{Re}\left\{\frac{1}{2} h_0^{(1)} |x_k|^2 + \sum_{i=1}^{Q} h_i^{(1)} x_k^* x_{k-i} + \sum_{i=Q+1}^{L} h_i^{(1)} x_k^* x_{k-i}\right\}\right] \cdot$$

$$\exp\left[-\frac{1}{N_0} \mathrm{Re}\left\{\frac{1}{2} h_0^{(3)} |x_k|^6 + \sum_{i=1}^{Q} h_i^{(3)} x_k^* |x_k|^2 x_{k-i} |x_{k-i}|^2 + \right.\right.$$

$$\left.\left.\sum_{i=Q+i}^{L} h_i^{(3)} x_k^* |x_k|^2 x_{k-i} |x_{k-i}|^2\right\}\right] \cdot \exp\left[$$

$$-\frac{1}{N_0} \mathrm{Re}\left\{h_0^{(1,3)} |x_k|^4 + \sum_{i=1}^{Q} x_k^* x_{k-i} (|x_k|^2 h_{-i}^{(1,3)*} + |x_{k-i}|^2 h_i^{(1,3)})\right\}\right] \cdot$$

$$\exp\left[-\frac{1}{N_0} \mathrm{Re}\left\{\sum_{i=Q+1}^{L} x_k^* x_{k-i} (|x_k|^2 h_{-i}^{(1,3)*} + |x_{k-i}|^2 h_i^{(1,3)})\right\}\right]$$

where $Q \leq L$ is a design parameter (an arbitrary integer) and $\mathrm{Re}\{\bullet\}$ denotes the real component of a complex number.

When time packing is employed, the assumption $h_i^{(1)}=0$, $h_i^{(3)}=0$, and $h_i^{(1,3)}=0$, for $|i|>L$ is not rigorously true, since the memory is theoretically infinite. In this case, L assumes the meaning of memory considered by the receiver since the ISI of the farthest symbols is not taken into account.

In equation (9), border effects are managed by assuming that symbols x are preceded by at least L known or zero symbols. From (9), it is clear that a possible sufficient statistic for this detection problem is thus represented by the sequences of samples $\{r_k^{(1)}\}$ and $\{r_k^{(3)}\}$. These sequences represent a bank of two filters (see FIG. 3), matched to the pulses $g^{(1)}(t)$ and $g^{(3)}(t)$ fed by the received signal r(t) and sampled at symbol rate. The first filter, matched to $g^{(1)}(t)$, can be considered representative of the linear response of the satellite channel while the second filter, matched to $g^{(3)}(t)$, can be considered representative of the third-order nonlinear response of the satellite channel.

An idea at the heart of the present invention is to design a detection algorithm, that works as a FBA (Forward-Backward Algorithm) for Q nearest interfering symbols, hence with complexity exponential in Q, but can also take into account the older L–Q symbols in a novel fashion, with complexity linear in L–Q, and, eventually, the remaining interfering symbols in a further simplified fashion. Therefore, design parameter Q determines the trade-off between performance (in terms of symbol error rate) and complexity.

Defining a trellis state $\sigma_k = (x_{k-1}, \ldots, x_{k-Q})$ and the corresponding vector $\sigma = \{\sigma_0, \ldots, \sigma_N\}$, the following factorization can be obtained $$P(x, \sigma \mid r) \propto p(r \mid x, \sigma) P(\sigma \mid x) P(x) = p(r \mid x) P(\sigma \mid x) P(x).$$

From the state definition it follows that the state in a generic time instant is completely determined by the previous state and the symbol transmitted in the previous interval, and hence the probability $P(\sigma \mid x)$ can be factorized as $$P(\sigma \mid x) = P(\sigma_0) \prod_{k=0}^{N-1} P(\sigma_{k+1} \mid \sigma_k, x_k) = P(\sigma_0) \prod_{k=0}^{N-1} I_k(\sigma_{k+1}, \sigma_k, x_k).$$

where $I_k(\sigma_{k+1}, \sigma_k, x_k)$ is the trellis indicator function, equal 1 if the next state $\sigma_{k+1}$ is compatible with the current state $\sigma_k$ and the symbol $x_k$. By using (5) and (9) and introducing the functions $$F_k(x_k, \sigma_k) = \quad (10)$$

$$\exp\left[\frac{1}{N_0} \mathrm{Re}\left\{x_k^*(r_k^{(1)} + |x_k|^2 r_k^{(3)}) - \frac{1}{2} h_0^{(1)} |x_k|^2 - \sum_{i=1}^{Q} h_i^{(1)} x_k^* x_{k-i} - \right.\right.$$

$$\frac{1}{2} h_0^{(3)} |x_k|^6 - \sum_{i=1}^{Q} h_i^{(3)} x_k^* |x_k|^2 x_{k-i} |x_{k-i}|^2 -$$

$$\left.\left.h_0^{(1,3)} |x_k|^4 - \sum_{i=1}^{Q} x_k^* x_{k-i} (|x_k|^2 h_{-i}^{(1,3)*} + |x_{k-i}|^2 h_i^{(1,3)})\right\}\right]$$

$$H_i(x_k, x_{k-i}) = \exp\left[-\frac{1}{N_0} \mathrm{Re}\{h_i^{(1)} x_k^* x_{k-i} + \right. \quad (11)$$

$$\left. h_i^{(3)} x_k^* |x_k|^2 x_{k-i} |x_{k-i}|^2 + x_k^* x_{k-i} (|x_k|^2 h_{-i}^{(1,3)*} + |x_{k-i}|^2 h_i^{(1,3)})\}\right]$$

the probability mass function $P(x, \sigma \mid r)$ can be factorized as $$P(x, \sigma \mid r) \propto \quad (12)$$

$$P(\sigma_0) \prod_{k=0}^{N-1} \left[I_k(x_k, \sigma_k, \sigma_{k+1}) P_k(x_k) F_k(x_k, \sigma_k) \prod_{i=Q+1}^{L} H_i(x_k, x_{k-i})\right].$$

In a known way, a $N_0$ value higher than the actual noise variance can be used in equations (10), (11) to improve the performance of the sub-optimal detector.

The meaning of equation (12)—or of a somehow different expression which could be obtained starting from slightly different assumptions—is that the probability mass function can be expressed by the product of N terms, each associated to a symbol $x_k$ and proportional to the product of an indicator function $I_k(\sigma_{k+1}, \sigma_k, x_k)$, an a priori probability $P_k(x_k)$, a first function $F_k(x_k, \sigma_k)$ representing the inter-symbol interference due to the Q symbols preceding said symbol $x_k$ and of a second function $H_i(x_k, x_{k-i})$ representing the inter-symbol interference due to the (L−Q) previous symbols, i.e. symbols identified by an index "i" taking values comprised between (L+1) and Q.

Figure 5:
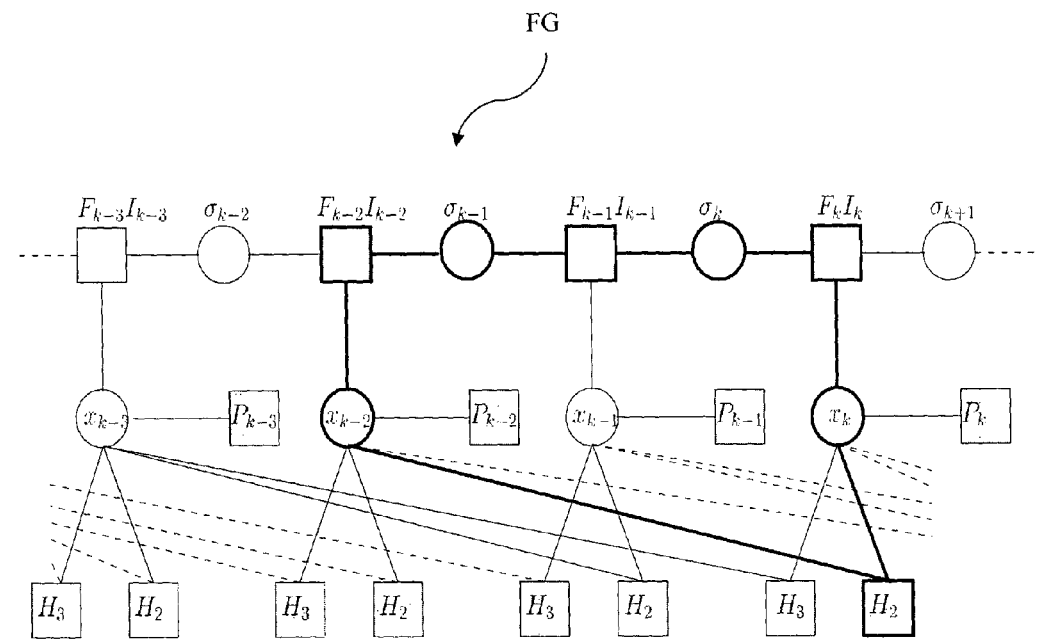
FIG. 5 is a factor graph illustrating the detection algorithm performed by a detector according to a single-user embodiment of the invention.

According to another aspect of the invention, the a posteriori probabilities (APPs) $P(x_k|r)$ that represent the outcome of the algorithm are computed by marginalizing the probability mass function, expressed by (12), by applying the well-known sum-product algorithm (SPA) [31]. FIG. 5 illustrates four sections of the Factor Graph (FG) corresponding to (12) for the case L=3 and Q=1.

It is important to note that the marginalization of (12) required for computing the target APPs of the modulation symbols cannot be exactly carried out by applying the SPA to the FG in FIG. 5, since it contains cycles [31]. In particular, two different kinds of cycles can occur. The first set of cycles, of length 6+2Q, involves both the upper and the lower part of the graph, as that bold-marked in the figure. The other cycles, of length six, involve only nodes in the lower part of the graph. This latter family of cycles occurs only when $2(Q+1) \leq L$. Hence, they are not present in FIG. 3, since Q=1 and L=3. When the length of the cycles is at least six, the SPA is generally expected to provide a good approximation of the exact marginals (see [31] for the general treatment, and [32, 33] for appealing applications). Hence, since the considered FG, irrespectively of the values of L and Q, does not contain any cycle of length lower than six, the SPA can be expected to effectively work.

Depending on the value of Q, two extreme scenarios occur. Clearly, when Q=L, the lower part of the FG disappears, the resulting FG is cycle-free and the SPA, which degenerates into the BCJR algorithm, is an exact implementation of the MAP symbol detection algorithm when there are at most L interfering symbols [31]. On the other hand, when Q=0, the upper part of the FG disappears and the graph-based detection algorithm described in [29] is obtained, whose FG has proper factor nodes connecting two interfering symbols given by (11). In this case, the resulting FG has length-six cycles (provided that L≥2) and the computation complexity of the SPA implementation is very limited, since M-ary messages only are propagated in the FG, and the complexity is only linear in L.

Finally, it is to remark that, unlike in the BCJR algorithm, which requires the propagation of $M^L$-ary messages, the messages over the considered FG are either M-ary (in the lower part of the FG) or $M^Q$-ary, in the upper part. Hence, it can be stated that the complexity of the proposed framework increases exponentially with the value of Q but only linearly with the value of L−Q, since this value only impacts on the number of edges in the FG, while the function nodes $\{H_i\}$ are connected with two variable nodes only, irrespectively of the value of L−Q. This is a very significant advantage of the inventive method over the prior art.

Figure 3:
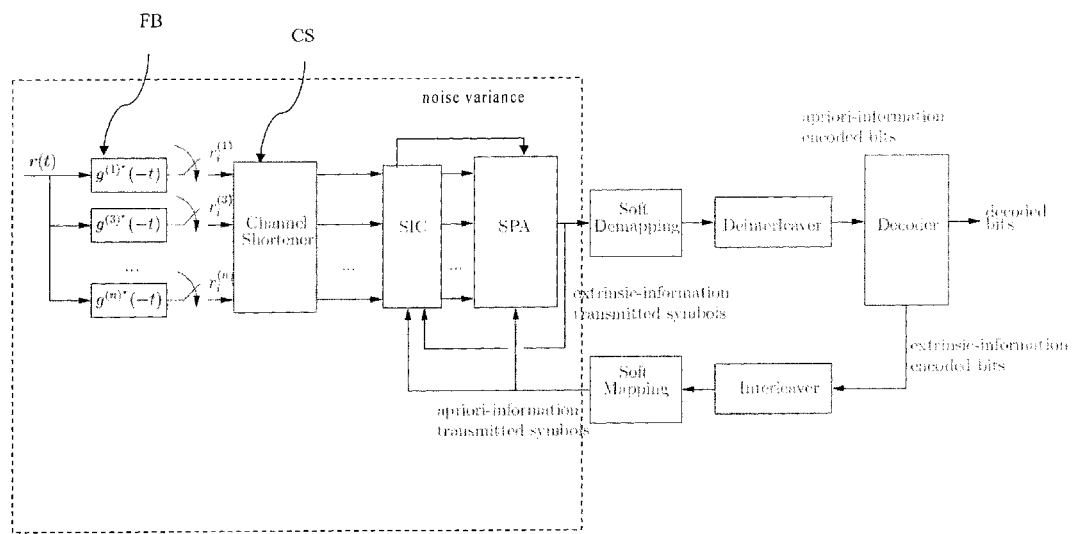
FIG. 3 is a block diagram of a data detector according to an embodiment of the invention, exchanging information with a SISO decoder.

As illustrated on FIG. 3, the APPs computed by the SPA processor are provided to a SISO decoder, whose outputs are: decoded bits and extrinsic information. The extrinsic information is returned to the SPA processor and used as the new a priori probability. The algorithm is then iterated e.g. for a predetermined number of iterations or until a suitable stopping condition is fulfilled. As the SPA processor operates on symbols and the decoder operates on bits, the two elements communicates through a (soft) mapper and a (soft) demapper, as well as an interleaver. On FIG. 3, a dotted box contains the elements composing the detector proper: filter back/sampler FB, channel shortener CS (described below), interference canceller SIC and SPA processor. The different elements of the detector and the decoder can be implemented using dedicated hardware, software run on programmable hardware or hybrid hardware/software solutions, as known in the arts of electronics and signal processing.

Equations 3-12 only consider lowest-order (i.e. third order) nonlinearity of the satellite transponder. However, taking into account higher-order contributions to the nonlinear response of the transponder (more generally: of the channel) does not pose any fundamental problem. In the case of fifth-order nonlinearity, the signal s(t) at the output of the transponder can be written as:

$$s(t) = \sum_k x_k [g^{(1)}(t-kT) + |x_k|^2 g^{(3)}(t-kT) + |x_k|^4 g^{(5)}(t-kT)]$$

where:

$$g^{(1)}(t) = \gamma_1 h^{(1)}(t) + \frac{3}{4}\gamma_3 \sum_{i \neq 0} \bar{h}^{(3)}(t-iT, t) +$$

$$\frac{5}{8}\gamma_5 \sum_{n \neq 0} \sum_{m \neq 0} \bar{h}^{(5)}(t-nT, t-mT, t),$$

$$g^{(3)}t = \frac{3}{4}\gamma_3 \bar{h}^{(3)}(t, t),$$

$$g^{(5)}t = \frac{5}{8}\gamma_3 \bar{h}^{(3)}(t, t, t).$$

The pulse $\bar{h}^{(5)}(t_1, t_2, t_3)$ is proportional to the approximate fifth-order Volterra kernel. The approximation consists of holding only the terms in the form $|x_p|^4 x_q$ among the 5-symbols products $x_i x_j^* x_l x_n^* x_m$ which appear in the polynomial expansion. This new signal model can lead to the same factorization (12) of the joint APP of the transmitted sequence and hence to the same FG of FIG. 5. The expressions of the relevant factors in the graph are more involved but the computational load per iteration remains unmodified.

Detection can be improved without increasing significantly the complexity of the algorithm by using interference cancellation, and preferably soft interference cancellation (SIC), to take into account more than L interfering symbols. Recalling the definitions (7) and (8), it is possible to write:

$$r_k^{(1)} = \sum_i h_i^{(1)} x_{k-i} + \sum_i h_i^{(1,3)} x_{k-i} |x_{k-i}|^2 + n_k^{(1)}$$

$$r_k^{(3)} = \sum_i h_{-i}^{(1,3)*} x_{k-i} + \sum_i h_i^{(3)} x_{k-i} |x_{k-i}|^2 + n_k^{(3)}$$

where $n_k^{(1)}$ and $n_k^{(3)}$ are proper noise samples. It is assumed that, at a given iteration, the equalization algorithm is activated with a set of a priori probabilities, coming from the SISO decoder, equal to $\{P_k(x_k)\}$. The algorithm performs SI self-iterations (being SI≥0 a design parameter) proceeding as follows:

1. iter=0 and the extrinsic probabilities $p^{(iter)}(r|x_k)$ are initialized to a constant value;

2. the following a posteriori moments of every code symbol is evaluated according to:

$$\mu_k^{(1)} = \sum_{x_k} x_k P(x_k \mid r)$$

$$\simeq \sum_{x_k} x_k P(x_k \mid r) \frac{p^{(iter)}(r \mid x_k)}{p^{(iter)}(r)}$$

$$V_k^{(1)} = \sum_{x_k} |x_k|^2 P(x_k \mid r) - |\mu_k^{(1)}|^2$$

$$\simeq \sum_{x_k} |x_k|^2 P(x_k) \frac{p^{(iter)}(r \mid x_k)}{p^{(iter)}(r)} - |\mu_k^{(1)}|^2$$

$$\mu_k^{(3)} = \sum_{x_k} x_k |x_k|^2 P(x_k \mid r)$$

$$\simeq \sum_{x_k} x_k |x_k|^2 P_k(x_k \mid r) \frac{p^{(iter)}(r \mid x_k)}{p^{(iter)}(r)}$$

$$V_k^{(3)} = \sum_{x_k} |x_k|^6 P(x_k \mid r) - |\mu_k^{(3)}|^2$$

$$\simeq \sum_{x_k} |x_k|^6 P_k(x_k) \frac{p^{(iter)}(r \mid x_k)}{p^{(iter)}(r)} - |\mu_k^{(3)}|^2.$$

It should be noted that $p^{(iter)}(r)$ plays the role of a constant normalization factor, and in fact need not to be evaluated or stored;

3. the average interference of symbols for $|i|>L$ is removed from all the received samples according to $$\tilde{r}_k^{(1)} = r_k^{(1)} - \sum_{|i|>L} h_i^{(1)} \mu_{k-1}^{(1)} - \sum_{|i|>L} h_i^{(1,3)} \mu_{k-i}^{(3)}$$

$$\tilde{r}_k^{(3)} = r_k^{(3)} - \sum_{|i|>L} h_i^{(1,3)*} \mu_{k-1}^{(1)} - \sum_{|i|>L} h_i^{(3)} \mu_{k-i}^{(3)}$$

4. The extrinsic probabilities $p^{(iter+1)}(r|x_k)$ are obtained through one iteration of the detector, with a noise variance for each symbol inflated at each iteration according to the values of $V_k^{(1)}$ and $V_k^{(3)}$. Therefore, the noise variance $N_0$ in equations (10) and (11) is replaced with a time-varying variance $(N_0)_k = N_0 + f(V_k^{(1)}, V_k^{(3)})$, where the function $f$ is properly chosen.

5. iter=iter+1; if iter<SI (the design parameter SI being the overall number of self-iterations) return to 2, otherwise continue;

6. the extrinsic probabilities fed to the SISO decoder are $\{p^{(SD)}(r|x_k)\}$.

As illustrated on FIG. 3, soft interference cancellation is performed by an interference canceller SIC arranged upstream from the detection processor SPA, receiving a priori information from the decoder and extrinsic information from the detector and passing to the detector processed samples $r_k^{(1)}$, $r_k^{(3)}$ and updated noise variance values.

The receiver complexity can be reduced for a given performance or the performance improved for a given complexity by adopting the channel shortening technique described in [34], properly extended here to the channel at hand. The channel shortening aims at finding the optimal digital filter (known as "channel shortener") for the samples at the output of the matched filter, and the optimal coefficients of ISI to be set at detector (known as target response). In other words, given the objective receiver constrained complexity corresponding to a channel memory of L, this technique finds the channel shortener and the target response that maximize the achievable information rate of the detector. In a known way, the detector is designed taking into account the target response instead of the actual response of the channel including the channel shortener; in turn, the target response is chosen in order to maximize the information rate. In general the optimization problem is convex with nonlinear constraints. Thus the solution can be carried out with standard numerical optimization methods with the limit of complexity due to the problem dimensionality. However closed-form expressions can be found, under suitable hypothesis. In [34] the channel shortener and target response expressions are found for the linear channel assuming independent transmitted symbols $x_k$ belonging to a constellation with Gaussian distribution. Although the solution is found for Gaussian symbols, simulation results in [34] show that good improvements are achieved also for low-order discrete constellations, like the PSK modulations.

The framework is generalized here to the nonlinear satellite channel. The sufficient statistics for the nonlinear satellite channel at each time i, is a vector in the form $$r_i = (r_i^{(1)}, r_i^{(3)})^T.$$

whose elements are given by eq. (7) and (8). Thus, the channel shortener can be in general a two-dimensional digital filter having impulse response $\{L_i\}$, where:

$$L_i = \begin{pmatrix} l_i^{(1)} & l_i^{(1,3)} \\ l_i^{(3,1)} & l_i^{(3)} \end{pmatrix}$$

is a proper 2×2 matrix, and the target response are the $\tilde{h}_i^{(1)}$, $\tilde{h}_i^{(1,3)}$, $\tilde{h}_i^{(3)}$ to be set at the detector.

Samples $\{r_i\}$ can be collected in block vector $r=[r_0T, \ldots, r_{N-1}^T]^T$ and we can rewrite the sufficient statistics as $$r = Hx + n$$

where the matrix H is a block Toeplitz matrix whose entries in (i,j) read $$H_{ij} = \begin{pmatrix} h_{j-i}^{(1)} & h_{j-i}^{(1,3)} \\ h_{-(j-i)}^{(1,3)*} & h_{j-i}^{(3)} \end{pmatrix}$$

and x and n are block vectors collecting the sequences $x_i = [x_i, x_i|x_i|^2]^T$ and the noise samples $n_i = [n_i^{(1)}, n_i^{(3)}]^T$.

Under the hypothesis that $x_i$, $x_i|x_i|^2$ are correlated Gaussian and independent from $x_k$ for any $i \neq k$, the achievable information rate $I_R$ for the detector with complexity L can be carried out in closed form using the approach showed in [34] properly extended to a block Toeplitz channel matrix H.

Namely, it is supposed that:

$$E\{xx^H\} = V$$

where the superscript H means the transpose and conjugate, and V is a block matrix such that:

$$V_{ij} = \begin{cases} 0, & i \neq j \\ V_d, & i = j \end{cases}.$$

where $V_d = E\{x_i x_i^H\}$ and does not depend on the time i.

The achievable information rate can be found as $$I_R = \log \det(\tilde{H}V+I) - Tr(LF^H[FVF^H+2N_0I]FL^H[\tilde{H}+V^{-1}]^{-1})$$

where F=Chol(H) is the Cholesky factorization of H, and L, $\tilde{H}$ are block Toeplitz matrix representing the channel shortener and the target response respectively.

The optimal channel shortener $\{L_i\}$, and the target response $\bar{h}_i^{(1)}$, $\bar{h}_i^{(1,3)}$, $\bar{h}_i^{(3)}$ to be set in (10) and (11), are thus found in closed form maximizing the achievable information rate by means of mathematical analysis. Taking the derivative of $I_R$ with respect to L, $\tilde{H}$ and setting it to zero, we can find the optimal channel shortener and target response.

Then, assuming an infinite transmission the optimal channel shortener is found in the frequency domain as $$L(\omega) = [\tilde{H}(\omega) + V_d^{-1}]V_d F(\omega)^H [F(\omega)V_d F(\omega)^H + 2N_0 I]^{-1}(F(\omega)^H)^{-1}$$

where $L(\omega)$ is the discrete-time Fourier transform (DTFT) of $\{L_i\}$.

The matrices $\{b_i\}$ with i=0, ..., L are defined as the inverse discrete-time Fourier transform (iDTFT) of:

$$B(\omega) = V_d - V_d F(\omega)^H [F(\omega)V_d F(\omega)H + 2N_0 I]^{-1} F(\omega) V_d,$$

and b is defined as the block vector $$b = [b_1, \ldots, b_L].$$

Moreover, B is defined as the block Toeplitz matrix whose entries read:

$$B_{ij} = b_{i-j}$$

and:

$$c = b_0 - b^H B^{-1} b.$$

The optimal target response is given by $$\tilde{H}(\omega) = U(\omega)^H U(\omega) - V_d$$

where $U(\omega)$ is the DTFT of a filter $\{U_i\}$ given by $$U_i = \begin{cases} Chol(C), & i = 0 \\ -Chol(C)\sum_{j=1}^{L} b_j B_{j-1,i}^{-1}, & i > 0 \end{cases}.$$

Figure 4:
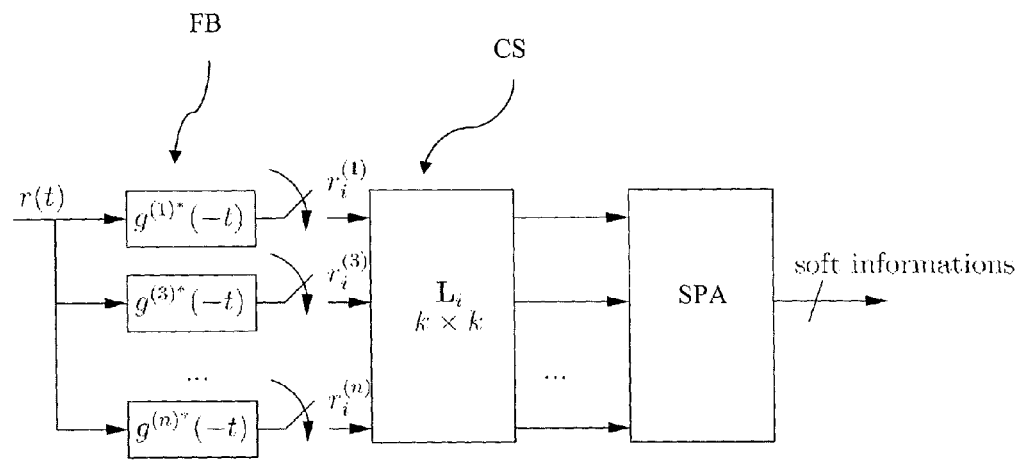
FIG. 4 illustrates a channel shortening filter used in the data detector of FIG. 3.

Channel Shortening can be employed more in general for a Volterra-series representation up to the n-order, with n odd. FIG. 4 shows the generalized receiver based on n-order Volterra-series representation, employing CS. A bank of k=(n+1)/2 filter is employed to obtain a sufficient statistics $r_i = (r_i^{(1)}, r_i^{(3)}, \ldots, r_i^{(n)})^T$, as it has been discussed above. This sufficient statistic $r_i$ is filtered by a k-dimensional filter whose output is used by the detection algorithm.

As illustrated on FIG. 3, the channel shortener (or channel shortening filter) CS is arranged between the filter bank FB and the interference canceller SIC (if present) or the SPA processor. The operation of the SPA processor has to take into account the presence of the channel shortener: in equations (10) and (11) impulse responses $h_i^{(1)}$, $h_i^{(3)}$ and $h_i^{(1,3)}$ are replaced by the target responses $\hat{h}_i^{(1)}$, $\hat{h}_i^{(1,3)}$, $\hat{h}_i^{(3)}$.

Until here, only single-user (or single-carrier) receivers have been considered, i.e. inter-carrier interference (ICI) has been neglected. However, the invention also applies to multiuser detection in the single-carrier-per-transponder scenario.

Using the Volterra-series representation up to the third order (generalization to higher orders is straightforward), in the presence of U interfering users, the approximated received signal can be expressed by $$r(t) = \sum_n \sum_{\ell=0}^{U-1} x_{n,\ell}(g^{(1)}(t-nT) + |x_{n,\ell}|^2 g^{(3)}(t-nT))e^{j2\pi \ell F_d t} + w(t). \quad (13)$$

A sufficient statistic for signal (13) can be obtained through a bank of filters matched to the pulses $g^{(1)}(t)$ and $g^{(3)}(t)$ and properly centred at each frequency $lF_d$. At discrete time k, the output of the two filters for user m can be expressed as:

$$r_{k,m}^{(1)} = \sum_n \sum_\ell x_{n,\ell}(h_{k,n,\ell,m}^{(1)} + |x_{n,\ell}|^2 h_{k,n,\ell,m}^{(1,3)}) + n_{k,m}^{(1)} \quad (14)$$

$$r_{k,m}^{(3)} = \sum_n \sum_\ell x_{n,\ell}(h_{n,k,m,\ell}^{(1,3)*} + |x_{n,\ell}|^2 h_{k,n,\ell,m}^{(3)}) + n_{k,m}^{(3)} \quad (15)$$

where $$h_{k,n,\ell,m}^{(1)} = e^{j2\pi(\ell-m)F_d nT} \int_{-\infty}^{\infty} g^{(1)}(t)g^{(1)*}(t-(k-n)T)e^{j2\pi(\ell-m)F_d t}dt$$

$$h_{k,n,\ell,m}^{(3)} = e^{j2\pi(\ell-m)F_d nT} \int_{-\infty}^{\infty} g^{(3)}(t)g^{(3)*}(t-(k-n)T)e^{j2\pi(\ell-m)F_d t}dt$$

$$h_{k,n,\ell,m}^{(1,3)} = e^{j2\pi(\ell-m)F_d nT} \int_{-\infty}^{\infty} g^{(3)}(t)g^{(1)*}(t-(k-n)T)e^{j2\pi(\ell-m)F_d t}dt$$

and $(n_{k,m}^{(1)}, n_{k,m}^{(3)})$ are coloured circularly-symmetric zero-mean Gaussian random variables. Equations (14) and (15) can be rewritten, for each k and m, in a matrix form as $$r = Hx + n$$

where the matrix H is a block matrix composed of submatrices of the form $$H_{k,n}^{\ell,m} = \begin{pmatrix} h_{k,n,\ell,m}^{(1)} & h_{k,n,\ell,m}^{(1,3)} \\ h_{n,k,m,\ell}^{(1,3)*} & h_{k,n,\ell,m}^{(3)} \end{pmatrix}$$

and the vectors x, r, n are obtained by the concatenation of the sub-vectors $$x_{k,l} = (x_{k,l}, x_{k,l}|x_{k,l}|^2)^T$$

$$r_{k,l} = (r_{k,l}^{(1)}, r_{k,l}^{(3)})^T$$

$$n_{k,l} = (n_{k,l}^{(1)}, n_{k,l}^{(3)})^T$$

respectively. By introducing the functions $$F_{k,\ell}(x_{k,\ell}, \sigma_{k,\ell}) = \exp\left[\frac{1}{N_0}\text{Re}\left\{x_{k,\ell}^\dagger r_{k,\ell} - \frac{1}{2}x_{k,\ell}^\dagger H_{k,k}^{\ell,\ell} x_{k,\ell} - \sum_{i=1}^{Q} x_{k,\ell}^\dagger H_{k,k-i}^{\ell,\ell} x_{k-i,\ell}\right\}\right]$$

$$G_{k,n}^{\ell,m}(x_{k,\ell}, x_{n,m}) = \exp\left[-\frac{1}{N_0}\text{Re}\{x_{k,\ell}^\dagger H_{k,n}^{\ell,m} x_{n,m}\}\right]$$

where $\sigma_{k,l} = (x_{k-1,l}, x_{k-2,l}, \ldots, x_{k-Q,l})$, the following factorization of the APP can be obtained:

$$P(x|r) = \prod_{k=0}^{N-1} \prod_{\ell=0}^{U-1} [P_{k,\ell}(x_{k,\ell})F_{k,\ell}(x_{k,\ell}, \sigma_{k,\ell})I_{k,\ell}(x_{k,\ell}, \sigma_{k,\ell}, \sigma_{k+1,\ell})]. \quad (16)$$

$$\prod_{i=Q+1}^{L} G_{k,k-i}^{\ell,\ell}(x_{k,\ell}, x_{k-i,\ell})$$

$$\prod_{i=1}^{L} \prod_{j \neq \ell}^{U} G_{k,k-i}^{\ell,j}(x_{k,\ell}, x_{k-i,j}) \prod_{j > \ell}^{U} G_{k,k}^{\ell,j}(x_{k,\ell}, x_{k,j})$$

The meaning of equation (16)—or of a somehow different expression which could be obtained starting from slightly different assumptions—is that the probability mass function can be expressed by the product of N×U terms, each associated to a symbol $x_{k,l}$ and proportional to the product of an indicator function $I_{k,l}(x_{k,l}, \sigma_{k,l}, \sigma_{k+1,l})$, an a priori probability $P_{k,l}(x_{k,l})$, a first function $F_{k,l}(x_{k,l}, \sigma_{k,l})$ representing the inter-symbol interference within carrier l due to the Q symbols preceding said symbol $x_{k,l}$, of a second function $$\prod_{i=Q+1}^{L} G_{k,k-i}^{\ell,\ell}(x_{k,\ell}, x_{k-i,\ell})$$

representing the inter-symbol interference within carrier l due to the (L−Q) previous symbols and of a third function $$\prod_{i=1}^{L} \prod_{j \neq \ell}^{U} G_{k,k-i}^{\ell,j}(x_{k,\ell}, x_{k-i,j}) \prod_{j > \ell}^{U} G_{k,k}^{\ell,j}(x_{k,\ell}, x_{k,j})$$

representative of inter-carrier interference.

Figure 6:
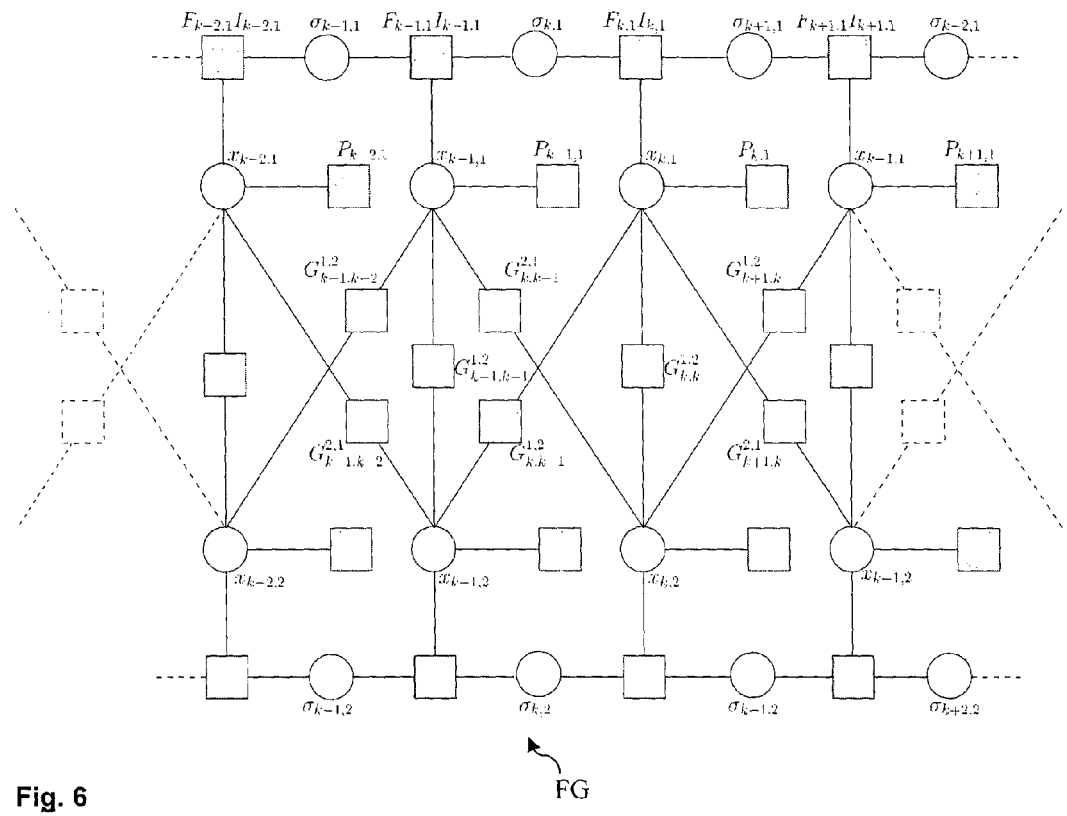
FIG. 6 is a factor graph illustrating the detection algorithm performed by a detector according to a multi-user embodiment of the invention.

The factor graph corresponding to equation (16) is represented on FIG. 6 for the case L=1, Q=1 (using L>1 would have resulted in a graph too intricate to be informative).

In order to keep maximum advantage of the inventive detector/detecting method, it is advantageous to use an optimized transmission scheme wherein the values of T, $F_u$, $F_d$, and the shape of the adopted pulses are chosen in order to maximize the spectral efficiency, thus allowing for ISI and ICI. It can be shown that the problem of determining the optimal pulse shape can be reduced to a finite-dimensional optimization problem, with dimension depending on the channel memory; this is rigorously true in the case of a linear channel, and approximately true for a nonlinear channel. The spectral efficiency measures the amount of information per unit of time and bandwidth and is given by the ratio between the information rate and the product between the symbol time and the occupied bandwidth. The information rate, in bits per channel use, can be computed—for a given detection/decoding scheme—by means of the simulation-based method described in [35]. A further degree of freedom is represented by the bandwidth of the shaping pulse that can be increased, thus increasing the interference for given values of $F_u$ and $F_d$.

This optimal values of T, $F_u$, and $F_d$, and the shape or bandwidth of the pulse p(t) depend on the employed detector—the larger the interference that the receiver can cope with, the larger the spectral efficiency and the lower the values of T, $F_u$, and $F_d$. This technique provides increased spectral efficiencies at least for low-order modulation formats. In fact, when dense constellations with shaping [9] are employed, it reduces to a scenario similar to that of the Gaussian channel with Gaussian inputs for which orthogonal signalling is optimal (although this is rigorously true for the linear channel and not in the presence of a nonlinear HPA, since shaping increases the peak-to-average power ratio). Improving the ASE without increasing the constellation order is very convenient since the larger the constellation size, the higher the decoding complexity. Moreover, it is well known that low-order constellations are more robust to channel impairments such as time-varying phase noise and non-linearity.

It is important to point out that there is a major difference with respect to faster-than-Nyquist or its extension to the frequency domain described in [10]. In that case, in fact, time and frequency spacings are chosen as the minimum values ensuring the same performance as in the case of absence of ISI with the optimal receiver. We here use the values corresponding to the maximum value of the spectral efficiency. These values result to be much lower than those adopted in the faster-than-Nyquist technique when applied to the same pulses. In addition, it is also possible to employ the same technique in case of pulses for which exist no values of T and F giving rise to absence of interference.

The technical result of the invention will now be discussed with reference to a specific example illustrated by FIGS. 7A-C and 8.

Figure 7A:
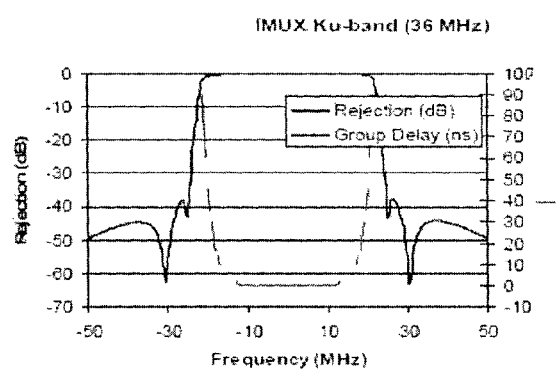
FIGS. 7A-7C illustrate the characteristics of a nonlinear satellite transponder.
Figure 7B:
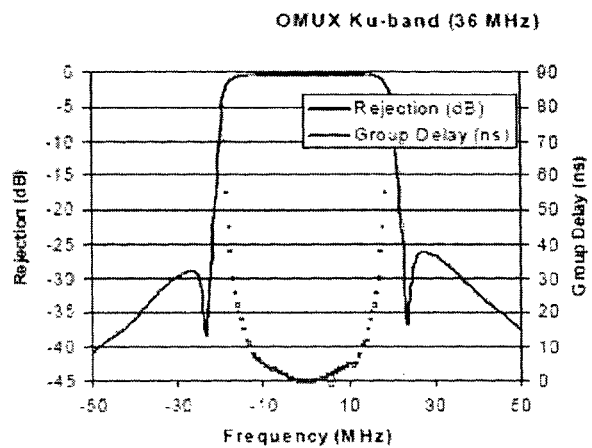
Figure 7C:
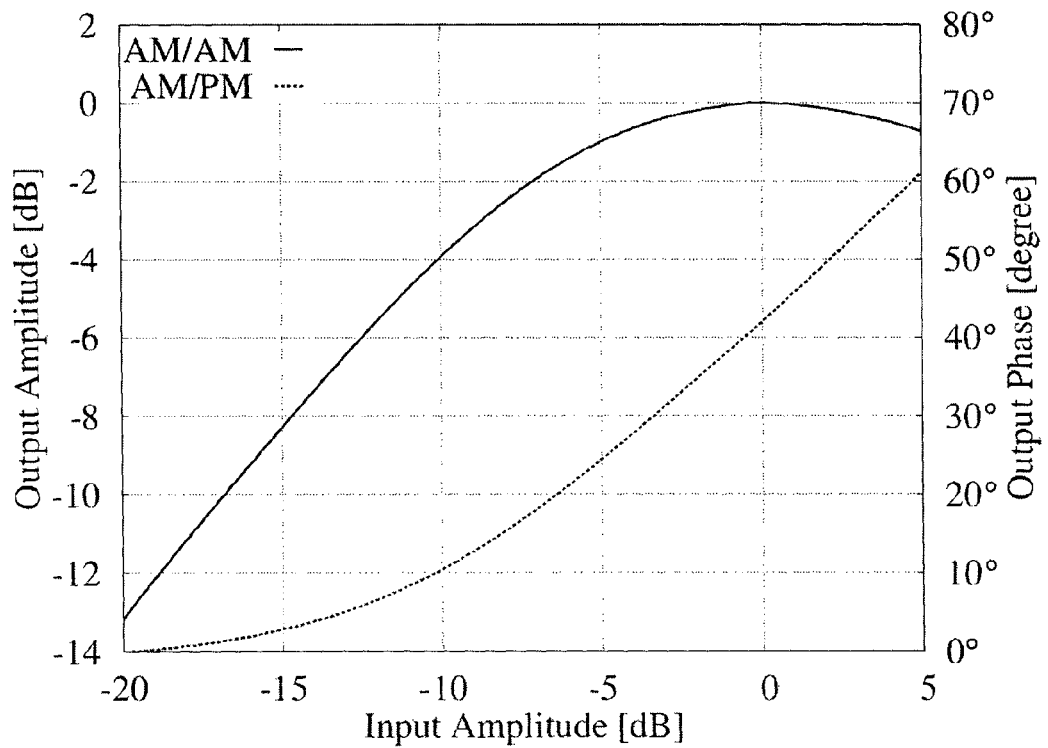

FIGS. 7A and 7B shows the transfer functions of the IMUX and OMUX of a transponder operating in the ku-band, while FIG. 7C shows the nonlinear Single Carrier Transfer Characteristics of the TWTA (Travelling Wave Tube Amplifier) HPA of said transponder. More precisely, the continuous curve (AM/AM) illustrates the relationship between input amplitude and output amplitude (left ordinate scale), while the dotted curve (AM/PM) illustrates the relationship between input amplitude and output phase (right ordinate scale).

Figure 8:
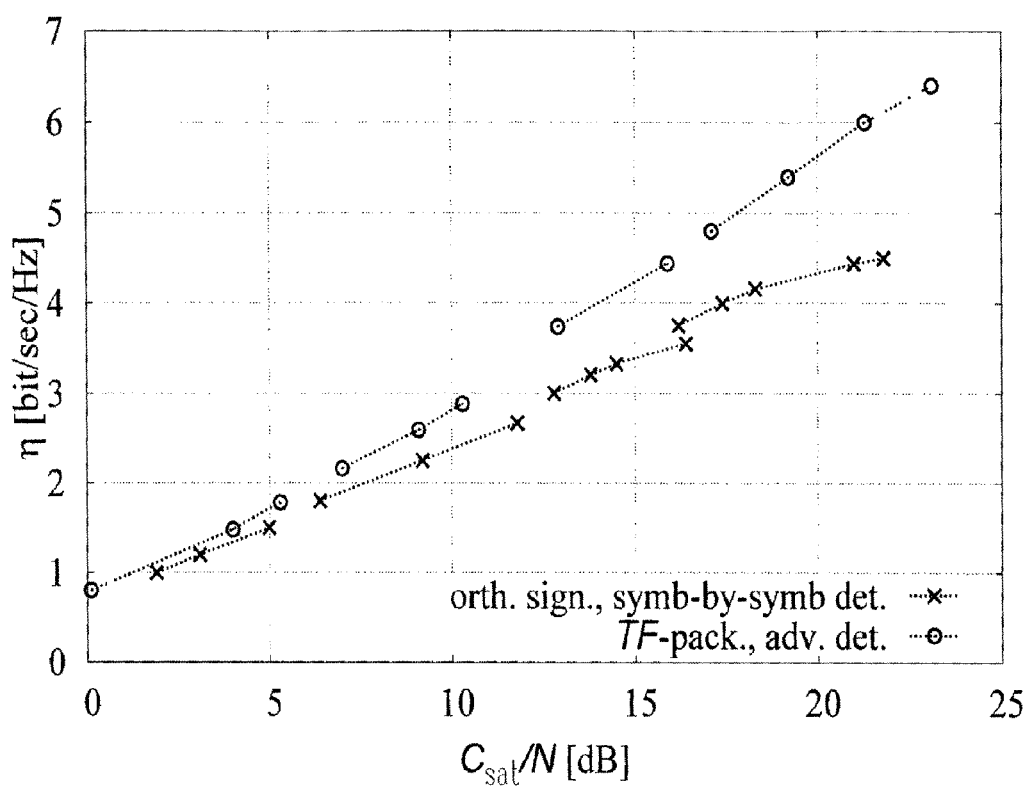
FIG. 8 is a plot illustrating the technical result of the invention.

FIG. 8 show a plot of the spectral efficiency η as a function of $C_{sat}/N$, where $C_{sat}$ is the saturation power when a non-modulated carrier ("pure tone") is transmitted and N is the noise power, for two different scenarios:

The dotted line with circles refers to the application of a single-user detection algorithm according to the invention, with optimal time-packing (TP), channel shortening (CS) without SIC, L=1 and Q=L;

The dotted line with crosses, to the case of orthogonal signalling and symbol-by-symbol detection.

In both cases the code-frame length is 64,800 bits, the transmit pulses are RRC with roll-of 20%, a DVB-S2-LDPC code is used and the rates are:

For the method according to the invention:
QPSK: 1/3; 1/2; 3/5
8PSK: 1/2; 3/5; 2/3
16APSK: 2/3; 3/4
32APSK: 2/3; 3/4; 5/6; 8/9

For the method with orthogonal signalling:
QPSK: 1/2; 3/5; 3/4
8PSK: 3/5; 3/4; 8/9
16APSK: 3/4; 4/5; 5/6; 8/9
32APSK: 3/4; 4/5; 5/6; 8/9; 9/10.

It can be seen that the present invention allows an increase of about 20% in spectral efficiency.

REFERENCES

[1] ETSI EN 301 307 Digital Video Broadcasting (DVB); V1.1.2 (2006-06), Second generation framing structure, channel coding and modulation systems for Broadcasting, Interactive Services, News Gathering and other Broadband satellite applications, 2006.

[2] J. E. Mazo, "Faster-than-Nyquist signaling," *Bell System Tech. J.*, vol. 54, pp. 1450-1462, October 1975.

[3] J. E. Mazo and H. J. Landau, "On the minimum distance problem for faster-than-Nyquist signaling," *IEEE Trans. Inform. Theory*, pp. 1420-1427, November 1988.

[4] A. Liveris and C. N. Georghiades, "Exploiting faster-than-Nyquist signaling," *IEEE Trans. Commun.*, pp. 1502-1511, September 2003.

[5] F. Rusek and J. B. Anderson, "On information rates of faster than Nyquist signaling," in *Proc. IEEE Global Telecommun. Conf.*, (San Francisco, Calif., U.S.A.), November 2006.

[6] F. Rusek and J. B. Anderson, "Maximal capacity partial response signaling," in *Proc. IEEE Intern. Conf. Commun.*, pp. 821-826, June 2007.

[7] A. Barbieri, D. Fertonani, and G. Colavolpe, "Time-frequency packing for linear modulations: spectral efficiency and practical detection schemes," *IEEE Trans. Commun.*, vol. 57, pp. 2951-2959, October 2009.

[8] A. Modenini, G. Colavolpe, and N. Alagha, "How to significantly improve the spectral efficiency of linear modulations through time-frequency packing and advanced processing" in *Proc. IEEE Intern. Conf. Commun.*, pp. 3299-3303, June 2012.

[9] A. R. Calderbank and L. H. Ozarow, "Nonequiprobable signaling on the Gaussian channel," *IEEE Trans. Inform. Theory*, vol. 36, pp. 726-740, July 1990.

[10] F. Rusek and J. B. Anderson, "The two dimensional Mazo limit," in *Proc. IEEE International Symposium on Information Theory*, (Adelaide, Australia), pp. 970-974, November 2005.

[11] B. F. Beidas and R. I. Seshadri, "Analysis and compensation for nonlinear interference of two high-order modulation carriers over satellite link," *IEEE Trans. Commun.*, vol. 58, pp. 1824-1833, June 2010.

[12] B. F. Beidas, "Intermodulation distortion in multicarrier satellite systems: analysis and turbo Volterra equalization," *IEEE Trans. Commun.*, vol. 59, pp. 1580-1590, June 2011.

[13] G. Colavolpe and A. Piemontese, "Novel SISO Detection Algorithms for Nonlinear Satellite Channels," *IEEE Wireless Commun. Letters*, vol. 1, pp. 22-25, February 2012.

[14] S. Benedetto and E. Biglieri, "Nonlinear equalization of digital satellite channels," *IEEE J. Select. Areas Commun.*, vol. 1, pp. 57-62, January 1983.

[15] C. Douillard, M. Jezequel, C. Berrou, A. Picart, P. Didier, and A. Glavieux, "Iterative correction of intersymbol interference: turbo-equalization," *European Trans. Telecommun.*, vol. 6, pp. 507-511, September/October 1995.

[16] M. Tüchler, R. Koetter, and A. C. Singer, "Turbo equalization: Principles and new results," *IEEE Trans. Commun.*, vol. 55, pp. 754-767, May 2002.

[17] M. Tüchler, A. C. Singer, and R. Koetter, "Minimum mean square error equalization using a priori information," *IEEE Trans. Signal Processing*, vol. 50, pp. 673-683, March 2002.

[18] G. Colavolpe, A. Barbieri, and G. Caire, "Algorithms for iterative decoding in the presence of strong phase noise," *IEEE J. Select. Areas Commun.*, vol. 23, pp. 1748-1757, September 2005.

[19] G. D. Forney, Jr., "Maximum-likelihood sequence estimation of digital sequences in the presence of intersymbol interference," *IEEE Trans. Inform. Theory*, vol. 18, pp. 284-287, May 1972.

[20] G. Ungerboeck, "Adaptive maximum likelihood receiver for carrier-modulated data-transmission systems," *IEEE Trans. Commun.*, vol. com-22, pp. 624-636, May 1974.

[21] L. R. Bahl, J. Cocke, F. Jelinek, and J. Raviv, "Optimal decoding of linear codes for minimizing symbol error rate," *IEEE Trans. Inform. Theory*, vol. 20, pp. 284-287, March 1974.

[22] G. Colavolpe and A. Barbieri, "On MAP symbol detection for ISI channels using the Ungerboeck observation model," *IEEE Commun. Letters*, vol. 9, pp. 720-722, August 2005.

[23] G. Colavolpe, G. Ferrari, and R. Raheli, "Reduced-state BCJR-type algorithms," *IEEE J. Select. Areas Commun.*, vol. 19, pp. 848-859, May 2001.

[24] D. Fertonani, A. Barbieri, and G. Colavolpe, "Reduced-complexity BCJR algorithm for turbo equalization," *IEEE Trans. Commun.*, vol. 55, pp. 2279-2287, December 2007.

[25] F. Rusek, M. Loncar, and A. Prlja, "A comparison of Ungerboeck and Forney models for reduced-complexity ISI equalization," in *Proc. IEEE Global Telecommun. Conf.*, (Washington, D.C., U.S.A.), November 2007.

[26] X. Wang and H. V. Poor, "Iterative (turbo) soft interference cancellation and decoding for coded CDMA," *IEEE Trans. Commun.*, vol. 47, pp. 1046-1061, July 1999.

[27] H. El Gamal and E. Geraniotis, "Iterative multiuser detection for coded CDMA signals in AWGN and fading channels," *IEEE J. Select. Areas Commun.*, vol. 18, pp. 30-41, January 2000.

[28] D. Fertonani, A. Barbieri, and G. Colavolpe, "Novel graph-based algorithms for soft-output detection over dispersive channels," in *Proc. IEEE Global Telecommun. Conf.*, (New Orleans, La., USA), November-December 2008.

[29] G. Colavolpe, D. Fertonani, and A. Piemontese, "SISO detection over linear channels with linear complexity in the number of interferers," *IEEE J. of Sel. Topics in Signal Proc.*, vol. 5, pp. 1475-1485, December 2011.

[30] J. G. Proakis, *Digital Communications*. New York: McGraw-Hill, 4th ed., 2001.

[31] F. R. Kschischang, B. J. Frey, and H.-A. Loeliger, "Factor graphs and the sum-product algorithm," *IEEE Trans. Inform. Theory*, vol. 47, pp. 498-519, February 2001.

[32] T. Richardson and R. Urbanke, "The capacity of low density parity check codes under message passing decoding," *IEEE Trans. Inform. Theory*, vol. 47, pp. 599-618, February 2001.

[33] G. Colavolpe and G. Germi, "On the application of factor graphs and the sum-product algorithm to ISI channels," *IEEE Trans. Commun.*, vol. 53, pp. 818-825, May 2005.

[34] F. Rusek and A. Prlja, "Optimal channel shortening for MIMO and ISI channels," *IEEE Trans. Wireless Commun.*, vol. 11, pp. 810-818, February 2012.

[35] D. M. Arnold, H.-A. Loeliger, P. O. Vontobel, A. Kavčić, and W. Zeng, "Simulation-based computation of information rates for channels with memory," IEEE Trans. Inf. Theory, vol. 52, pp. 3498-3508, August 2006.

The invention claimed is:
1. A data detection method, comprising the steps of:
   a. receiving a signal transmitted over a communication channel, said signal being representative of at least a stream of interfering symbols $x_k$, each representing one or more bits of a transmitted message;

b. filtering the received signal through at least a filter bank comprising at least a first filter representative of a linear response of said channel and a second filter representative of a non-linear response of said channel, and sampling the filtered signals at the symbol rate, thus obtaining respective sequences of filtered samples $r_k^{(1)}$, $r_k^{(3)}$; and c. jointly computing the a posteriori probabilities of N>1 consecutive symbols $x_k$ by applying the sum-product algorithm to a probability mass function expressed by the product of N terms, each being associated to a symbol $x_k$ and being proportional to the product of an indicator function, an a priori probability, a first function representing the inter-symbol interference due to the Q symbols which precede said symbol $x_k$ and of a second function representing the inter-symbol interference due to the (L−Q) symbols immediately preceding said Q symbols which precede symbol $x_k$;

where:
L is an integer greater than zero, representing the memory of the communication channel;
Q is an integer greater than zero and not greater than L, serving as a design parameter;
thus realizing simultaneous soft-input-soft-output detection of a packet of N symbols of the transmitted message, and wherein said probability mass function is expressed by:

$$P(x, \sigma | r) \propto P(\sigma_0) \prod_{k=0}^{N-1} \left[ I_k(x_k, \sigma_k, \sigma_{k+1}) P_k(x_k) F_k(x_k, \sigma_k) \prod_{i=Q+1}^{L} H_i(x_k, x_{k-i}) \right]$$

where:
x is a vector constituted by N symbols $x_k$ with k=0 to N−1;
σ is a vector formed by N trellis states $\sigma_k$, each representing the Q symbols preceding symbol $x_k$ with k=0 to N−1;
r is a vector constituted by said sequences of filtered samples;
$I_k(x_k, \sigma_k, \sigma_{k+1})$ is a trellis indicator state equal to 1 if the state $\sigma_{k+1}$ is compatible with the state $\sigma_k$ and zero otherwise;
$P(x_k)$ is the a priori probability of symbol $x_k$;

$F_k(x_k, \sigma_k) =$
$$\exp\left[ \frac{1}{N_0} \mathrm{Re}\left\{ x_k^*(r_k^{(1)} + |x_k|^2 r_k^{(3)}) - \frac{1}{2} h_0^{(1)} |x_k|^2 - \sum_{i=1}^{Q} h_i^{(1)} x_k^* x_{k-i} - \frac{1}{2} h_0^{(3)} |x_k|^6 - \right.\right.$$
$$\sum_{i=1}^{Q} h_i^{(3)} x_k^* |x_k|^2 x_{k-i} |x_{k-i}|^2 - h_0^{(1,3)} |x_k|^4 -$$
$$\left.\left. \sum_{i=1}^{Q} x_k^* x_{k-i} (|x_k|^2 h_{-i}^{(1,3)*} + |x_{k-i}|^2 h_i^{(1,3)}) \right\} \right]; \text{ and}$$

$$H_i(x_k, x_{k-i}) = \exp\left[ -\frac{1}{N_0} \mathrm{Re}\{ h_i^{(1)} x_k^* x_{k-i} + h_i^{(3)} x_k^* |x_k|^2 x_{k-i} |x_{k-i}|^2 + \right.$$
$$\left. x_k^* x_{k-i} (|x_k|^2 h_{-i}^{(1,3)*} + |x_{k-i}|^2 h_i^{(1,3)}) \} \right],$$

wherein for $F_k(x_k, \sigma_k)$ and $H_i(x_k, x_{k-i})$ $h_i^{(1)} = \int_{-\infty}^{\infty} g^{(1)}(t) g^{(1)*}(t-iT) dt;$ $h_i^{(3)} = \int_{-\infty}^{\infty} g^{(3)}(t) g^{(3)*}(t-iT) dt;$ $h_i^{(1,3)} = \int_{-\infty}^{\infty} g^{(3)}(t) g^{(1)*}(t-iT) dt;$ $g^{(1)}(t) = \gamma_1 h^{(1)}(t) + \frac{3}{4} \gamma_3 \sum_{i \neq 0} \overline{h}^{(3)}(t - iT, t);$ ; and $g^{(3)}(t) = \frac{3}{4} \gamma_3 \overline{h}^{(3)}(t,t)$ $\overline{h}^{(3)}(t_1, t_2) = h^{(3)}(t_2, t_1, t_1) + h^{(3)}(t_1, t_2, t_1) - I(t_1-t_2) h^{(3)}(t_2, t_2, t_2),$ and wherein the functions $\gamma_1 h^{(1)}(t)$ and $\frac{3}{4} \gamma_3 h^{(3)}(t_1, t_2, t_3)$ are Volterra kernels of first and third order, respectively.

2. A data detection method according to claim 1, wherein said second filter is representative of a third-order contribution to the nonlinear response of said channel.

3. A data detection method according to claim 2, wherein said or each said filter bank comprises one or more additional filters representative of higher-order contributions to the nonlinear response of said channel and providing respective sequences of filtered samples.

4. A data detection method according to claim 1, wherein L is lower than N.

5. A data detection method according to claim 1, wherein Q is lower than L.

6. A data detection method according to claim 1, further comprising an interference cancellation step comprising subtracting from said sequences of filtered samples an estimated contribution from symbols $x_{k-i}$ with i>L before performing said step c.

7. A data detection method according to claim 6 wherein said interference cancellation step comprises soft interference cancellation performed by estimating and subtracting from said sequences of filtered samples an average contribution from symbols $x_{k-i}$ with i>L.

8. A data detection method according to claim 1, further comprising a step of performing channel-shortening filtering of said sequences of filtered samples using a k-dimensional filter, k being the number of sequences, said step being performed before step c.

9. A data detection method according to claim 1, wherein said transmitted message is encoded, the method being carried out iteratively by, at each iteration:
performing said steps a. and c.;
providing said a posteriori probabilities to a soft-input-soft-output decoder;
obtaining extrinsic information from said soft-input-soft-output decoder and using it to determine a priori probabilities for the subsequent iteration.

10. A multi-user data detection method according to claim 1, wherein said signal is representative of a plurality of streams of symbols, each symbol representing one or more bits of a respective transmitted message, each said stream being transmitted over a respective communication channel using a respective carrier; and wherein said step c. is carried out by applying the sum-product algorithm to a probability mass function expressed by the product of N×U terms, each of said terms being associated to a symbol $x_{k,l}$ and proportional to the product of an indicator function, an a priori probability, a first function representing the inter-symbol interference within carrier l due to the Q symbols which precede said symbol $x_{k,l}$, of a second function representing the inter-symbol interference within carrier l due to the (L−Q) symbols immediately preceding said Q symbols which precede symbol $x_{k,l}$; and of a third function representative of inter-carrier interference, U>1 being the number of interfering carriers, thus realizing simultaneous soft-input-soft-output detection of U packets of N symbols.

11. A multi-user data detection method according to claim 10 wherein said probability mass function is expressed by:

$$P(x|r) = \prod_{k=0}^{N-1}\prod_{\ell=0}^{U-1} [P_{k,\ell}(x_{k,\ell})F_{k,\ell}(x_{k,\ell},\sigma_{k,\ell})I_{k,\ell}(x_{k,\ell},\sigma_{k,\ell},\sigma_{k+1,\ell})]$$

$$\prod_{i=Q+1}^{L} G_{k,k-i}^{\ell,\ell}(x_{k,\ell},x_{k-i,\ell})\prod_{i=1}^{L}\prod_{j\neq\ell}^{U} G_{k,k-i}^{\ell,j}(x_{k,\ell},x_{k-i,j})\prod_{j>L}^{U} G_{k',k}^{\ell,j}(x_{k,\ell},x_{k,j})$$

where:
  x is a vector constituted by U concatenated packets of N symbols $x_{k,l}$ to be detected;
  r is a vector constituted by U concatenated sequences of filtered samples, one for each of said carriers;
  $\sigma_{k,l}$ is one of N trellis states for carrier l, each representing the Q symbols preceding symbol $x_{k,l}$ with k=0 to N−1 and l=0 to U−1;
  $I_{k,l}(x_{k,l},\sigma_{k,l},\sigma_{k+l,l})$ is a trellis indicator state equal to 1 if the state $\sigma_{k+l,l}$ is compatible with the state $\sigma_{k,l}$ and zero otherwise;
  $P_{k,l}(x_{k,l})$ is the a priori probability of symbol $x_{k,l}$;
  $F_{k,l}(x_{k,l},\sigma_{k,l})$ is a function depending on the filtered samples for carrier l and representing the inter-symbol interference within said carrier due to the Q symbols preceding symbol $x_{k,l}$;
  $G_{k,k-i}^{l,l}(x_{k,l},x_{k-i,l})$ is a function representing interference between symbol $x_{k,l}$ and symbol $x_{k-i,l}$ within carrier l; and
  $G_{k,k-i}^{l,j}(x_{k,l},x_{k-i,j})$ and $G_{k,k}^{l,j}(x_{k,l},x_{k,j})$ are functions representing interference between symbols of carriers l and j.

12. A data detection method according to claim 1, wherein said or each said communication channel is a satellite channel.

13. A multiuser data detection method according to claim 10, wherein said communication channels are satellite channel comprising a separate nonlinear transponder for each said carrier.

14. A data detector comprising:
  at least a filter bank comprising at least a first filter representative of a linear response of a communication channel and a second filter representative of a nonlinear response of said channel;
  a sampler for sampling the outputs of said filters at a symbol rate of a received signal, thus obtaining respective sequences of filtered samples $r_k^{(1)}$, $r_k^{(3)}$; and
  a processor for taking said sequences of filtered samples as inputs and realizing simultaneous soft-input-soft-output detection of a packet of N interfering symbols $x_k$ by applying the sum-product algorithm to a probability mass function expressed by the product of N terms, each being associated to a symbol $x_k$ and being proportional to the product of an indicator function, an a priori probability, a first function representing the inter-symbol interference due to the Q symbols which precede said symbol $x_k$ and of a second function representing the inter-symbol interference due to the (L−Q) symbols immediately preceding said Q symbols which precede symbol $x_k$;

where:
  L is an integer greater than zero, representing the memory of the communication channel;
  Q is an integer greater than zero and not greater than L, serving as a design parameter;
thus realizing simultaneous soft-input-soft-output detection of a packet of N symbols of the transmitted message, and wherein said probability mass function is expressed by:

$$P(x,\sigma|r) \propto P(\sigma_0)\prod_{k=0}^{N-1}\left[I_k(x_k,\sigma_k,\sigma_{k+1})P_k(x_k)F_k(x_k,\sigma_k)\prod_{i=Q+1}^{L} H_i(x_k,x_{k-i})\right]$$

where:
  x is a vector constituted by N symbols $x_k$ with k=0 to N−1;
  σ is a vector formed by N trellis states $\sigma_k$, each representing the Q symbols preceding symbol $x_k$ with k=0 to N−1;
  r is a vector constituted by said sequences of filtered samples;
  $I_k(x_k,\sigma_k,\sigma_{k+1})$ is a trellis indicator state equal to 1 if the state $\sigma_{k+1}$ is compatible with the state $\sigma_k$ and zero otherwise;
  $P(x_k)$ is the a priori probability of symbol $x_k$;

$$F_k(x_k,\sigma_k) =$$
$$\exp\left[\frac{1}{N_0}\text{Re}\left\{x_k^*(r_k^{(1)}+|x_k|^2 r_k^{(3)}) - \frac{1}{2}h_0^{(1)}|x_k|^2 - \sum_{i=1}^{Q}h_i^{(1)}x_k^* x_{k-i} - \frac{1}{2}h_0^{(3)}|x_k|^6 - \right.\right.$$
$$\sum_{i=1}^{Q}h_i^{(3)}x_k^*|x_k|^2 x_{k-i}|x_{k-i}|^2 - h_0^{(1,3)}|x_k|^4 -$$
$$\left.\left.\sum_{i=1}^{Q} x_k^* x_{k-i}(|x_k|^2 h_{-i}^{(1,3)*} + |x_{k-i}|^2 h_i^{(1,3)})\right\}\right]; \text{ and}$$

$$H_i(x_k,x_{k-i}) = \exp\left[\frac{1}{N_0}\text{Re}\{h_i^{(1)}x_k^* x_{k-i} + h_i^{(3)}x_k^*|k_k|^2 x_{k-i}|x_{k-i}|^2 + \right.$$
$$\left. x_k^* x_{k-i}(|x_k|^2 h_{-i}^{(1,3)*} + |x_{k-i}|^2 h_i^{(1,3)})\}\right],$$

wherein for $F_k(x_k,\sigma_k)$ and $H_i(x_k,x_{k-i})$ $h_i^{(1)}=\int_{-\infty}^{\infty} g^{(1)}(t)g^{(1)*}(t-iT)dt;$ $h_i^{(3)}=\int_{-\infty}^{\infty} g^{(3)}(t)g^{(3)*}(t-iT)dt;$ $h_i^{(1,3)}=\int_{-\infty}^{\infty} g^{(3)}(t)g^{(1)*}(t-iT)dt;$ $$g^{(1)}(t) = \gamma_1 h^{(1)}(t) + \frac{3}{4}\gamma_3 \sum_{i\neq 0}\bar{h}^{(3)}(t-iT,t);$$

and $g^{(3)}(t) = \tfrac{3}{4}\gamma_3 \bar{h}^{(3)}(t,t)$ $\bar{h}^{(3)}(t_1,t_2) = h^{(3)}(t_2,t_1,t_1) + h^{(3)}(t_1,t_2,t_1) - I(t_1-t_2)h^{(3)}(t_2,t_2,t_2),$
and wherein the functions $\gamma_1 h^{(1)}(t)$ and $\tfrac{3}{4}\gamma_3 h^{(3)}(t_1,t_2,t_3)$ are Volterra kernels of first and third order, respectively.

15. A data detector according to claim 14 further comprising an interference canceller for subtracting from said sequences of filtered samples an estimated contribution from symbols $x_{k-i}$ with i>L before performing said step c.

16. A data detector according to claim 14 further comprising a k-dimensional channel-shortening filter taking said sequences of filtered samples as input and providing filtered outputs to said processor or to said interference canceller, k being the number of sequences.

17. A data detector according to claim 14 further comprising a soft-input-soft-output decoder iteratively exchanging extrinsic information with said processor.

18. A multi-user data detector according to claim 14, comprising:
a plurality of filter banks associated to respective transmission channels, each comprising at least a first filter representative of a linear response of a communication channel and a second filter representative of a non-linear response of said channel;
a sampler for sampling the outputs of said filters at a symbol rate of a received signal, thus obtaining respective sequences of filtered samples; and
a processor for taking said sequences of filtered samples as inputs and realizing simultaneous soft-input-soft-output detection of U packets of N symbols $x_{k,l}$ by applying the sum-product algorithm to a probability mass function expressed by the product of N×U terms, each being associated to a symbol $x_{k,l}$ and being proportional to the product of an indicator function, an a priori probability, a first function representing the inter-symbol interference within carrier l due to the Q symbols which precede said symbol $x_{k,l}$, of a second function representing the inter-symbol interference within carrier l due to the (L−Q) symbols immediately preceding said Q symbols which precede symbol $x_{k,l}$; and of a third function representative of inter-carrier interference; wherein:
L is an integer greater than zero, representing the memory of the communication channel;
Q is an integer greater than zero and not greater than L, serving as a design parameter; and
U>1 is the number of interfering carriers.

19. A multi-user data detector according to claim 18 wherein said probability mass function is expressed by:

$$P(x|r) = \prod_{k=0}^{N-1} \prod_{\ell=0}^{U-1} [P_{k,\ell}(x_{k,\ell}) F_{k,\ell}(x_{k,\ell}, \sigma_{k,\ell}) I_{k,\ell}(x_{k,\ell}, \sigma_{k,\ell}, \sigma_{k+1,\ell})] \cdot$$

$$\prod_{i=Q+1}^{L} G_{k,k-i}^{\ell,\ell}(x_{k,\ell}, x_{k-i,\ell}) \prod_{i=1}^{L} \prod_{j \neq \ell}^{U} G_{k,k-i}^{\ell,j}(x_{k,\ell}, x_{k-i,j}) \prod_{j>L}^{U} G_{k,k}^{\ell,j}(x_{k,\ell}, x_{k,j})$$

where:
x is a matrix constituted by U packets of N symbols $x_{k,l}$ to be detected;
r is a matrix constituted by U sequences of filtered samples, one for each of said carriers;
$\sigma_{k,l}$ is one of N trellis states for carrier l, each representing the Q symbols preceding symbol $x_{k,l}$ with k=0 to N−1 and l=0 to U−1;
$I_{k,l}(x_{k,l}, \sigma_{k,l}, \sigma_{k+1,l})$ is a trellis indicator state equal to 1 if the state $\sigma_{k+1,l}$ is compatible with the state $\sigma_{k,l}$ and zero otherwise;
$P_{k,l}(x_{k,l})$ is the a priori probability of symbol $x_{k,l}$;
$F_{k,l}(x_{k,l}, \sigma_{k,l})$ is a function depending on the filtered samples for carrier l and representing the inter-symbol interference within said carrier due to the Q symbols preceding symbol $x_{k,l}$;
$G_{k,k-i}^{l,l}(x_{k,l}, x_{k-i,l})$ is a function representing interference between symbol $x_{k,l}$ and symbol $x_{k-i,l}$ within carrier l; and
$G_{k,k-i}^{l,j}(x_{k,l}, x_{k-i,j})$ and $G_{k,k}^{l,j}(x_{k,l}, x_{k,j})$ are functions representing interference between symbols of carriers l and j.

20. A method of transmitting data over a communication channel by modulating at least one carrier using a succession of pulses having a same shape and a complex amplitude chosen among a discrete set of allowed values defining a finite-order constellation, the method being characterized in that at least one parameter chosen between a bandwidth of said pulses, a shape of said pulses and a temporal spacing between said pulses is chosen so as to maximize spectral efficiency when detection is performed using a method according to claim 1.

21. A method according to claim 20 wherein said communication channel is a satellite channel.

22. A method according to claim 20 comprising modulating a plurality of carriers with respective succession of said pulses, a frequency separation between said carriers being chosen so as to maximize spectral efficiency when detection is performed using a method according to claim 10, and transmitting said modulated carriers over respective communication channels.

23. A method according to claim 22, wherein said respective communication channels are satellite channel comprising a separate nonlinear transponder for each said carrier.

* * * * *